United States Patent [19]
Zandbergen

[11] 4,066,131
[45] Jan. 3, 1978

[54] HITCH ASSEMBLY FOR GARDEN TRACTOR AND INDEPENDENTLY OPERABLE GROUND TILLER

[75] Inventor: Herman P. Zandbergen, Wheaton, Ill.

[73] Assignee: White Farm Equipment Company, Cleveland, Ohio

[21] Appl. No.: 618,389

[22] Filed: Oct. 1, 1975

[51] Int. Cl.² .......................................... A01B 59/042
[52] U.S. Cl. ..................................... 172/680; 172/78; 172/315; 280/492
[58] Field of Search ................................. 172/76–79, 172/677, 680, 257, 260, 315, 668; 280/492

[56] References Cited

U.S. PATENT DOCUMENTS

| | | | |
|---|---|---|---|
| 1,934,141 | 11/1933 | Prentice | 280/492 |
| 1,935,811 | 11/1933 | Metcalf | 172/79 UX |
| 2,153,309 | 4/1939 | Milz et al. | 280/492 |
| 2,430,770 | 11/1947 | Hyler | 280/492 X |
| 2,516,813 | 7/1950 | Valin | 280/492 |
| 2,531,557 | 11/1950 | Dayton | 172/79 X |
| 2,551,451 | 5/1951 | Morkoski | 172/668 |
| 2,603,136 | 7/1952 | Thomas | 172/79 X |
| 2,753,639 | 7/1956 | Huebner et al. | 172/315 X |
| 2,787,943 | 4/1957 | Browning | 172/78 X |
| 3,193,022 | 7/1965 | Wesley et al. | 172/76 |

FOREIGN PATENT DOCUMENTS 68,313  11/1957  France ............................. 280/492

*Primary Examiner*—Paul E. Shapiro
*Attorney, Agent, or Firm*—Lockwood, Dewey, Zickert & Alex

[57] ABSTRACT

A hitch assembly for detachably connecting an independently operable rotary ground tiller to the rear of a garden tractor or other riding vehicle for towed operation therebehind. Remote tiller clutch and tilling depth controls are mounted on the tractor within easy reach of the tractor operator.

The hitch assembly includes a draw bar hitch pivotally mounted to the rear of the garden tractor, a tongue member mounted to and extending forward from the tiller, and a dual pivotal mounting universal joint releasably pivotally mounted to and between the draw bar and tongue. Removable pivot pins provide means for maintaining the universal joint in pivotally mounted relation between the tongue and draw bar.

As hitched to the tractor, the rotary ground tiller, when desired, may be easily disconnected for independent walk-behind operation by removing one of the pivot pins from the hitch mounting, disconnecting the remote clutch control cable, and remounting the conventional tiller clutch control to the clutch.

4 Claims, 8 Drawing Figures

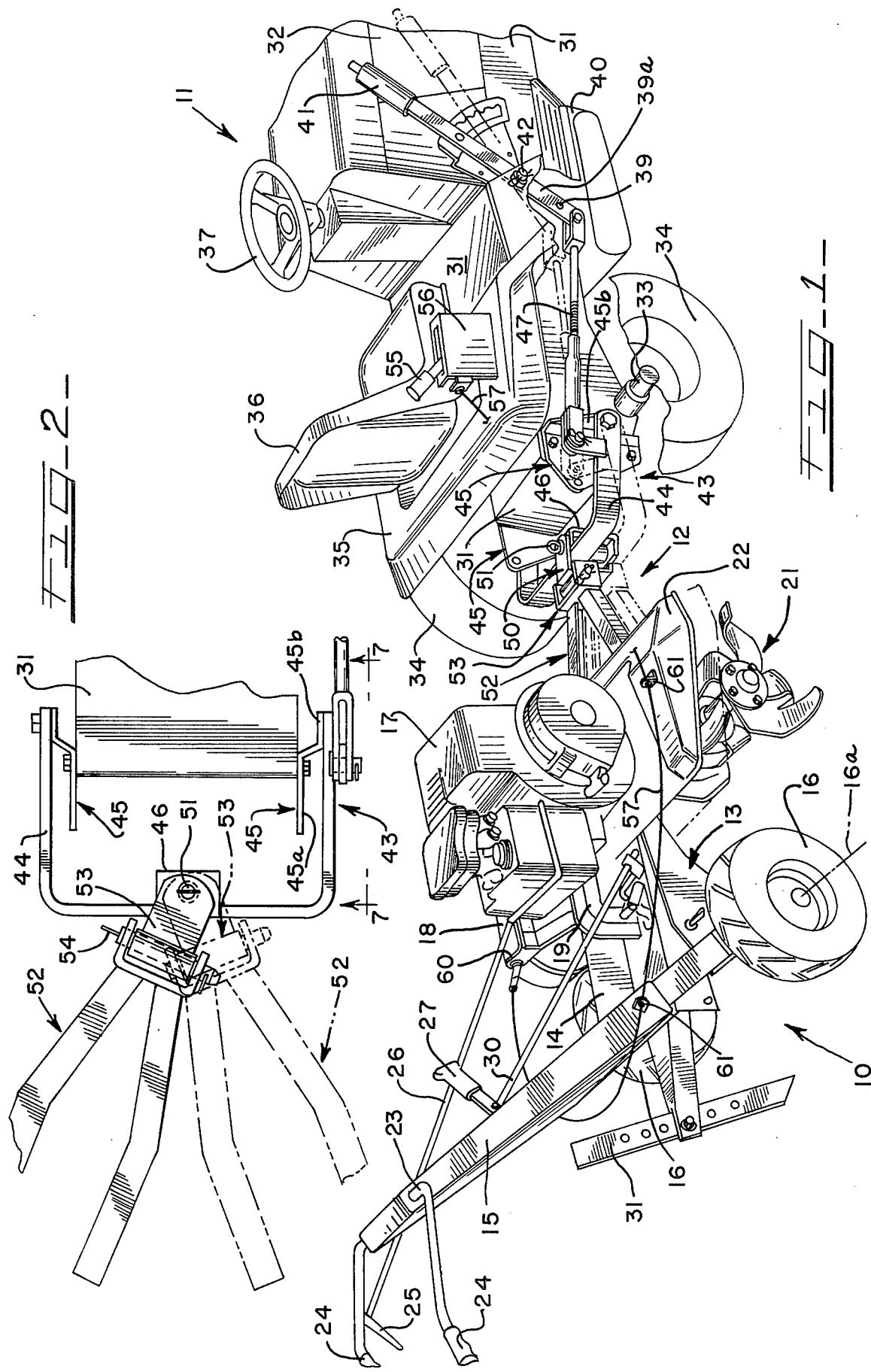

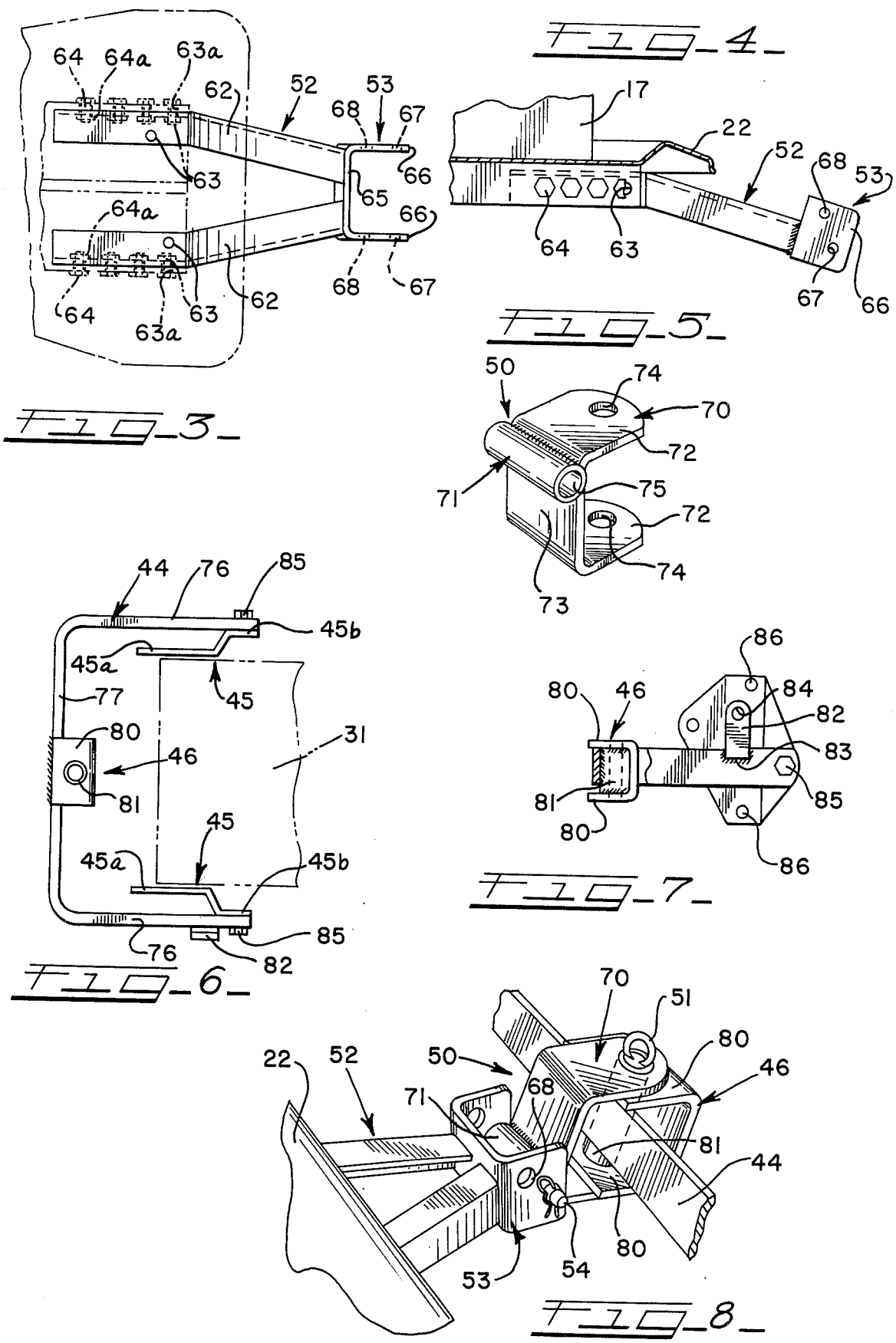

HITCH ASSEMBLY FOR GARDEN TRACTOR AND INDEPENDENTLY OPERABLE GROUND TILLER

This invention relates generally to powered garden, lawn, and farm implements, and more specifically to a disengagable hitch for connecting an independently operable walk-behind rotary ground tilling machine to the rear of a powered tractor. When the ground tiller is attached through the hitch to the tractor for towed operation therebehind, means for controlling the clutch engagement between the tiller engine and the rotating tines and means for controlling the tilling depth are remotely positioned on the tractor for ease of manipulation by an operator sitting in the driver's seat thereof.

Ground tillers having rotating tines capable of churning up soil have long been popular with farmers, landscapers, and gardeners. Several varieties of ground tillers suitable for differing size tilling operations are produced by farm implement and garden tool manufacturers. One type of ground tilling machine is the walk-behind, hand-operated self-propelled tiller or rotary cultivator. This walk-behind tiller is made for use in tilling gardens and other smaller plots of ground.

Another type of ground tiller, more suitable for relatively larger tilling operations, is mounted on the rear of a farm tractor and driven by the tractor engine through a power-take-off located at the rear of the tractor. This type of tiller is not operable independently of the tractor.

In view of the increasing popularity of tractors, and particularly garden and lawn tractors of the riding type, applicant has determined that a means for removably attaching a walk-behind self-driven ground tiller to the rear of such tractors would provide the convenience of large plot tilling capability when towed behind the tractor and small plot capability with the same machine when operated independently of the tractor. Also, it would be convenient to perform rough ground preparation with a tiller towed behind a tractor and to perform cultivation of growing gardens, etc., with the tiller operated in walk-behind manner.

Applicant's invention therefore, provides a unique universal hitch assembly for connecting an independently operable ground tiller to the rear of a tractor or other powered implement for the convenience of towed operation therebehind. The hitch includes tongue means mounted to and extending forwardly of the ground tiller, and pivotal connection means for connecting the tongue to the tractor in a manner which is selectively releasable. The hitch provides vertical and horizontal pivotal movement between the tractor or other powered implement and the ground tiller.

It is therefore an object of this invention to provide hitch means for releasably attaching an independently operable walk-behind ground tiller to the rear of a powered vehicle for convenient towed operation therebehind.

Another object of the invention is the provision of a universal hitch assembly for releasably connecting an independently operable ground tiller to the rear of a powered tractor for operation while being towed therebehind.

A further object of the invention is the provision of a connection between a garden or lawn tractor and an independently operable ground tiller in which the tiller is towed behind the tractor and in which the tilling depth of the tines and the driving engagement between the tiller motor and tines is effectuated by remote control means mounted on the tractor for ease of accessibility to an operator sitting in the driver's seat.

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements in which:

FIG. 1 is a rear perspective view of a walk-behind ground tiller as it appears connected to a rider garden tractor by a releasable universal hitch assembly according to the invention, the front of the tractor being broken away;

FIG. 2 is a plan view of the universal hitch assembly of FIG. 1 in which the pivotal relation of the tongue and the universal portion to draw bar portion of the hitch is shown with alternate positions indicated in broken line;

FIG. 3 is a plan view of the tongue of the universal hitch assembly shown in FIG. 1 and which is mounted on and projects forwardly from the ground tiller, a portion of which is shown in broken line;

FIG. 4 is an elevational view of the tongue portion of the hitch shown in FIG. 3 as it appears attached to the framework of the ground tiller which is shown in fragmentary sectional view;

FIG. 5 is a perspective view of the intermediate member of the hitch shown in mounted position in FIG. 1;

FIG. 6 is an elevational view of the draw bar portion of the hitch shown in mounted position in FIG. 2;

FIG. 7 is a side elevational view of the draw bar portion of the hitch taken on line 7—7 of FIG. 2; and FIG. 8 is a fragmentary perspective view of the hitch shown in FIG. 1, but with the intermediate member inverted from that of FIG. 1 for providing a deeper tilling cut.

The hitch assembly of the invention which is described in detail below and shown in the drawings is a relatively refined hitch embodying features for making the connection between the towing vehicle and the independently power tiller most versatile. It can be appreciated that other, less refined, hitches, such as a ball joint hitch or the like, may also be utilized as a vehicle/tiller connection within the scope of the invention.

Referring to FIG. 1, an independently operable walk-behind ground tiller is indicated generally at 11. The hitch assembly embodying the invention which maintains the ground tiller 10 in detachable towed relation behind the garden tractor 11, is indicated generally at 12. The ground tiller 10 is of conventional walk-behind construction and includes a frame 13 having an engine mounting portion 14 and a control portion 15 extending angularly upward and rearwardly from the engine mounting portion 14. A pair of ground wheels 16—16 are mounted on the frame 13 and provide for rear support and portable movement of the ground tiller. An engine 17 of conventional type is mounted to the engine mounting portion 14 of the frame 13 and is drivably connected through clutch 18 and transmission assembly 19 to the ground working tine assembly, generally indicated at 21, which is rotatably mounted to the bottom of engine mounting portion 14 of the frame 13. A protective cover or shield 22 is positioned between the engine 17 and the tine assembly 21.

A handlebar 23 is attached to the distal end of frame control portion 15 and includes hand grips (shown partially) at 24—24 which may be gripped by an operator thus providing for manual control of movement of the ground tiller 10. A clutch control lever 25 is pivotally mounted to the handlebar 23 and its pivotal movement acts through control rod 26 to engage or disengage the clutch 18 and thereby controllably actuate and de-actuate the tine assembly when the ground tiller 10 is in an independently operable condition. Clutch 18 includes a pivotally movable idler pulley (not shown). The movement of the idler pulley alternately loosens or tightens a drive belt connecting a drive pulley carried by the drive shaft of the engine 17 to a driven pulley at the transmission assembly 19 which provides driving engagement with the tine assembly 21. A shift lever 27 pivotally connected to the control portion 15 of frame 13 provides for forward, neutral, and reverse control of the tine assembly 21 through transmission assembly 19 by a control rod 30 extending therebetween. A depth bar 31 is attachable to the tail of the engine mounting portion 14 of frame 13 in a plurality of differing vertically oriented positions. The bottom tip of bar 31 penetrates the ground during operation, adds braking action to the tiller, determines the operating angle of the tiller 10 relative the ground to be tilled, and thereby provides one means of controlling the depth of tilling. The depth bar may be utilized in both walk-behind and towed operations.

The self-propelled garden tractor 11 is conventional in construction and includes a frame 31 extending from the front to the rear of the tractor. An engine compartment 32 is positioned at the front of the tractor and has an engine (not shown) mounted therein. The engine is drivably connected through a power train (not shown) to a rear axle 33 which is mounted to frame 31 at the back end of the tractor, and to rear wheels 34—34 mounted to the axle on opposite sides of frame 31. A rear body panel 35 mounted on top of frame 31 covers the top portion of wheels 34—34. A driver's seat 36 is also mounted on the top of frame 31. Steering wheel 37 is drivably connected to the tractor front wheels (not shown) in conventional form for steering the tractor. Commonly, a grass mowing attachment 40 including rotary mower blades (not shown) is adjustably mounted below the frame 31. The height of the mowing attachment 40 above ground level is determined by a lift lever 41 which is pivotally mounted to frame 31 at 42 and connected at 39 therealong by linkage 39a (partially shown) to mowing attachment 40. Arcuate movement of lever 41 raises and lowers the mowing attachment 40. It should be noted that like the garden tractor II, a larger lawn or farm tractor may be utilized with the hitch of the invention. Also, the hitch of the invention may be utilized to connect an independently operated rotary tiller to a riding mower or other vehicle for towed operation therebehind.

The universal joint hitch assembly 12 which releasably connects the ground tiller 10 to the garden tractor 11 includes a draw bar hitch assembly, generally indicated at 43, including a U-shape draw bar 44 pivotally mounted at its distal ends to a pair of draw bar mounting plates 45—45 rigidly secured to the sides of frame 31 rearwardly of rear axle 33. At the center of the bight or central portion of draw bar 44 is mounted a first pivotal mounting or clevis 46. The first pivotal mointing 46 may also be offset to one side of draw bar 44 to provide tilling immediately behind one of the tractor wheels.

Lift lever 41 described above is also utilized to determine the elevation of the first pivotal mounting 46. A connecting link 47 is mounted between the lift lever 41 and the draw bar 44 such that movement of the lever raises and lowers the first pivotal mounting 46. When the lift lever is used to control the position of draw bar, it is preferred that the mowing attachment 40 be retained in its highest mounted position under tractor 11 by hangers, (not shown) or other suitable retaining means.

A universal joint fixture or intermediate member, generally indicated at 50, is pivotally mounted to first pivotal mounting 46 on draw bar 44 and secured in place by a removable first pivot pin 51.

A tongue member, generally indicated at 52, is rigidly mounted to and extends forward from the engine mounting portion 14 of ground tiller frame 13. At the distal end of tongue member 52 is a second pivotal mounting or clevis 53 which is also removably pivotally mountable to universal joint 50 by means of a removable second pivot pin 54.

In order to fully and effectively operate the ground tiller 10 from the tractor seat 36, a remote clutch control lever 55 (FIG. 1) is attached by a pivotal mounting 56 to the rear body panel 35 adjacent the driver seat 36. The clutch control rod 26 is disconnected from the clutch 18, and an operating bowden wire cable 57 is connected thereto and rigged through a mounting bracket 60 and eyelet guides 61—61 to the clutch lever mounting 56 and finally to the remote clutch lever 55. Cable 57 moves inside a flexible protective covering such that when lever 55 is moved forward the clutch is engaged and when lever 55 is in its rearward position the clutch is disengaged. Cable 57 is readily disengageable from clutch 18 and remote clutch lever 55, thus allowing the ground tiller 10 to be easily disconnected from the tractor 11.

As shown in FIGS. 1 and 2 the double pivotal relation provided by the universal joint hitch of the invention allows sufficient freedom of movement of the ground tiller 10 relative the tractor 11 to provide for efficient ground tilling when towed therebehind. In FIG. 2 the pivotal relation around the first pivotal mounting 46 on draw bar 44 of the draw bar assembly 43 is shown. The removable first pivot pin 51 is the center of pivotal movement around which tongue member 52 and universal joint 53 pivot as shown in both solid and broken line. In FIG. 2, the attachement of the draw bar mounting plate 45 to the rear of tractor frame 31 is shown in more detail. In FIG. 1, the up and down pivotal relation between tongue member 52 and the intermediate member 50 through second removable pivot pin 54 (FIG. 2) is shown in raised position in solid line and lowered position in broken line in FIG. 1.

While the relative up and down pivotal positions around second pivotal mounting 53 may be determined partially by the ground terrain which the tractor 11 and towed ground tiller 10 traverse, the pivotal relation is also determined by the setting or position of lift lever 41 described previously. The height above ground of the second pivotal mounting 53 and the relative vertical position of second pivotal mounting 53 in relation to the pivotal axis 16a of tiller wheels 16 determines the depth at which the assembly 21 tills the ground thereunder. Draw bar 44 is positioned lower by pushing lift lever 41 downward and forward and results in a greater depth of tilling for the assembly 21. Lift lever 41 therefore performs the same function when the ground tiller 10 is connected to tractor 11 that depth bar 31 performs when the ground tiller 10 is operated independently from the tractor 11. Therefore, depth bar 31 does not have to be used when tiller 10 is connected in towed relation to tractor 11. However, use of depth bar 31 when the tiller 10 is connected to the tractor 11 does not hinder tiller operation.

The elements of the universal joint hitch are shown in detail in FIGS. 3 through 7. In FIGS. 3 and 4 the tongue member 52 is shown including the U-shape second pivotal mounting portion 53 at its forward distal end. The tongue member 52 includes a pair of arm members 62—62, each having a right angle cross section, and the rear portions of which extend in parallel spaced-apart relation for fixed mounting to the engine mounting portion 14 of the frame 13 in ground tiller 10. A pair of mounting holes 63—63 in the horizontal flange of angle members 62 and a plurality of holes 63a in the vertical webb portion of each arm member 62 provide a means for positioning mounting bolts 64—64 (FIG. 4) therethrough and through mating holes 62a in each arm member. The bolts 64—64 are then fastened with nuts 64a to attach the tongue member 52 rigidly to the engine mounting portion 14 of the frame 13. Both arm members 62—62 extend forwardly of frame engine mounting portion 14 and forwardly of tiller protective shield 22 in a converging direction and are rigidly joined at their front ends to the base or bight portion 65 of U-shape second pivotal mounting 53. The pivotal mounting 53 includes a pair of generally parallel vertically oriented flanges 66—66 which are joined by the relatively flat bight or base portion 65 therebetween. Each flange 66 includes a plurality of pivotal mounting holes 67, 68 which are aligned with similar holes in the opposing flange and suitable for receiving the second removable pivot pin 54 therethrough. The pairs of aligned mounting holes 67, 68 are positioned in spaced-apart vertical orientation across flanges 66—66 as shown in FIG. 4 to provide differing vertical mounting positions to the universal joint 50.

In FIG. 5, the universal joint member 50 is shown and includes two portions, a U-shape first mating pivotal mounting or clevis 70 and a tubular second pivotal mounting 71. The U-shape first mounting 70 includes a pair of generally parallel spaced-apart flanges 72—72 and a generally flat base or bight portion 73 between the flanges 72—72 and perpendicular thereto. The second pivotal mounting 71 is tubular in shape having a cylindrical hole 75 extending axially therethrough which provides means for retaining the second pivot pin 54 therein. The second pivotal mounting 71 is positioned offset the first pivotal mounting bight portion 73 to one side thereof. The offset mounting combined with invertibility of the first pivotal mounting 70 enables additional height adjustment for the tongue member 52 and thereby provides additional adjustability to the depth of tilling range of the tiller 10 as towed behind tractor 11.

An inversely mounted universal joint 50 is shown in FIG. 8 wherein the first pivotal mounting 70 is attached to first pivotal mounting 46 through pivot pin 51 such that the second pivotal mounting 71 is located at the bottom of the bight portion 73 as mounted thereon inversely to that as shown in FIG. 1. The mounting of tongue member 52 could be positioned even lower on universal joint 50 than shown in FIG. 8 by removing second pivot pin 54 and aligning upper pivot holes 68—68 with second pivotal mounting 71 and repositioning second pivot pin 54 therethrough.

The draw bar 44 and draw bar mounting plates 45—45 to which the distal ends of draw bar 44 are pivotally mounted are shown in FIGS. 6 and 7. Draw bar 44 is generally U-shaped and includes parallel side arms 76—76 connected by the generally flat bight or end bar portion 77 which is mounted on tractor frame 31 (FIG. 1). Mounted centrally upon the end bar portion 77 is the first pivotal mounting 46 which is U-shaped having generally parallel top and bottom flanges 80—80 having a vertical tubular member 81 mounted centrally between, connecting, and positioned through flanges 80—80 having a vertical tubular member 81 mounted centrally between, connecting, and positioned through flanges 80—80. Tubular member 81 provides added rigidity to the pivotal mounting 46 and the cylindrical hole extending axially through tubular member 81 provides for retaining first pivot pin 51 therein. The rear end of upper flange 80 is rigidly mounted to end bar 77 by welding, brazing, or the like as is a portion of tubular member 81 which is contiguous with the inside surface of end bar 77 for providing a rigid mounting of first pivot member 46 to the end bar 77. A pivot arm 82 (FIG. 7) extends perpendicularly upward from one of the side members 76 to which it is mounted at 83 and includes a pivotal mounting hole 84 adjacent the upper end thereof for attaching one end of turn buckle connecting link 47. At the distal ends of side arms 76—76 are pivotal mounting holes (not shown) through which bolts 85—85 are positioned to pivotally mount the draw bar mounting bracket 45 includes a relatively large flat portion 45a which is fitted against the side of tractor frame 31 and mounted thereto by positioning bolts or other fastening means through mounting holes 86—86 therein. The draw bar 44 is pivotally mounted to the mounting brackets 45 through a mounting hole (not shown) therein suitable for the positioning of bolts 85 therethrough. The mounting holes (not shown) are in a portion of the bracket 45b which is offset outwardly from the portion 45a which abuts the tractor frame 31. A portion of the mounting brackets 45—45 extend rearwardly of the tractor frame 31 for mounting a conventional draw bar lift lever (not shown) thereto. The conventional draw bar lift lever is operable when the driver of the tractor 11 reaches behind himself while in a seated position and grasps the lever. These parts have not been shown to clarify the other portions of the hitch in close proximity thereto but may be left on a conventional draw bar hitch for ground tiller operation although the added linkages (not shown should be disconnected from the draw bar itself.

The hitch of the invention is functionally advantageous as it enables one to utilize the convenience of a modern garden tractor or other powered vehicle to operably tow a conventional walk-behind ground tiller therebehind. The operability of the tiller clutch and depth of till is controlled from the tractor. Also, the hitch and controls are easily disconnected to allow conventional walk-behind use of the tiller when desired. This hitch enlarges the versatility of both the vehicle and the ground tiller and provides greater convenience of operability than heretofore available in either the vehicle or tiller separately.

While a particular embodiment of the invention has been shown and described, it will be obvious to those skilled in the art that changes and modifications may be made without departing from the invention in its broader aspects. For example, the twin angular arm members 62—62 forming a portion of the tongue 52 could be joined to form a one piece member. Also, the tubular and C-shape pivotal mountings can be interchanged or reversed and provide the same functional relationship therebetween. Further, a single dual planer pivotal mounting may be utilized (such as a ball hitch), and the pivotal mounting could be mounted directly to a tractor or mower frame at the rear thereof. Therefore, the aim in the appended claims is to cover all such changes and modifications as fall within the true spirit and scope of the invention.

I claim:

1. A universal hitch for connecting an independently operable ground tiller to the rear of a garden tractor for towed operation therebehind, said hitch comprising:

tongue means adapted to rigidly mount on and extend forwardly of said ground tiller, and universal joint means including first and second pivotal member mountings oriented perpendicularly to each other, said first pivotal mounting being attachable to said riding vehicle, and said second pivotal mounting being attachable to said tongue means for providing dual planer pivotal movement between said vehicle and said ground tiller, said second pivotal member mounting is positioned offset relative the center of said first pivotal member mounting, and said first and second pivotal member mountings are inversely attachable to said vehicle and said tongue means respectively for varying the mounted height above ground of said universal hitch.

2. The universal hitch called for in claim 1 wherein at least one of said first and second pivotal mountings is releasable.

3. The universal hitch called for in claim 1 wherein said first and second pivotal member mountings are female pivotal mountings, said vehicle and tongue means include female pivotal mountings, and a first pivotal mounting pin is removably insertable through said first pivotal member mounting and a portion of said vehicle, and a second pivotal mounting pin is removably insertable through said second pivotal member mounting and said tongue means.

4. The hitch called for in claim 1 further including means including a pivotally mounted lever assembly adapted to be mounted on said garden tractor for controlling the engagement of a clutch in said ground tiller, said means being selectively releasable for independent operation of said tiller.

* * * * *